United States Patent Office 2,870,107
Patented Jan. 20, 1959

2,870,107

SYNTHETIC RUBBER COMPOSITION CONTAINING ROSIN ACID AND DITHIOCARBAMATE ACCELERATING AGENT AND METHOD OF PRODUCING SAME

William B. Reynolds and Paul G. Carpenter, Bartlesville, Okla., assignors to Phillips Petroleum Company, a corporation of Delaware No Drawing. Application September 18, 1953
Serial No. 381,123

15 Claims. (Cl. 260—27)

This invention relates to a novel synthetic rubber composition. In one aspect, it relates to an improved rosin-extended, rubbery polymer composition containing a vulcanization accelerator. In another aspect it relates to a method for promoting vulcanization of a rosin-extended, rubbery copolymer without inducing premature vulcanization of the rubber mix. In another aspect, it relates to a vulcanizable butadiene-styrene copolymer composition containing rosin or a rosin acid and an accelerator and having a desirably high rate of cure and a low tendency to scorch. In another aspect, it relates to the production of a novel, vulcanizable, rosin-extended butadiene-styrene copolymer composition containing an economical and small amount of an accelerator.

Accelerators for the vulcanization of rubber, both natural and synthetic vary greatly in the rate of vulcanization produced and the degree of cure that is attained. Many of the accelerators used heretofore have either produced low rates of cure or, when high rates result, the product is susceptible to scorching or other detrimental effects unless the temperature and other factors affecting the cure are critically controlled. Rosin-extended synthetic rubber requires relatively large amounts of most commercial vulcanization accelerators to effect a satisfactory cure and these high accelerator requirements increase the cost of the products materially.

This invention involves the use of alkyl sulfenyl dithiocarbamates as vulcanization accelerators for rosin-extended synthetic rubbers. These accelerators greatly reduce the curing time and effect a high degree of economy, both from their low cost of production and the unusually small quantities required for optimum effect. Rubber mixes in which these vulcanization accelerators are employed have less tendency to scorch, i. e., to undergo premature vulcanization during milling, storing, and other processing steps prior to the vulcanization step than when conventional accelerators are used.

According to this invention, there is provided a novel, vulcanizable, synthetic copolymer composition comprising a rubbery synthetic polymer, a relatively large amount of rosin or rosin acid, and an alkyl sulfenyl dithiocarbamate as an accelerator of vulcanization.

Also according to this invention, there is provided a method of producing a synthetic rubber, said method comprising incorporating into a rosin-extended, synthetic, rubbery polymer a small amount of an alkyl sulfenyl dithiocarbamate and recovering a resulting composition which can readily be vulcanized and which does not have an undesirably high tendency to scorch.

The alkyl sulfenyl dithiocarbamate vulcanization accelerators of this invention can be represented by the formula

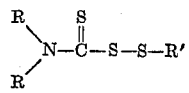

wherein each R is selected from the group consisting of hydrogen, hydrocarbon radicals, and radicals which together with the nitrogen form a heterocyclic ring, but with not more than one R being hydrogen, and R' is an alkyl radical. Preferably the total number of carbon atoms in the combined R groups is not more than 20 and R' is not more than 16. Typical of these compounds are N,N-dimethyl-S-tertiary-butyl sulfenyl dithiocarbamate, N,N-pentamethylene-S-tertiary-butyl sulfenyl dithiocarbamate, N,N-(3-oxapentamethylene)-S-tertiary-butyl sulfenyl dithiocarbamate, and N-S-tertiary-butyl sulfenyl dithiocarbamate. Other alkyl sulfenyl dithiocarbamates of interest are those containing a branched thioalkyl group such as -S-isopropyl, -S-tertiary-amyl, -S-tertiary-heptyl, and -S-tertiary-dodecyl. Further examples are: N,N-didodecyl-S-tert-hexadecyl sulfenyl dithiocarbamate, N-tert-butyl-N-tert-hexadecyl-S-tert-butyl sulfenyl dithiocarbamate, N,N-di(tert-butylcyclohexyl)-S-tert-butyl sulfenyl dithiocarbamate, N,N-di(diethylphenyl)-S-tert-butyl sulfenyl dithiocarbamate, and N,N-di-decyl-S-tert-hexadecyl sulfenyl dithiocarbamate.

The quantity of alkyl sulfenyl dithiocarbamate vulcanization accelerator employed will vary depending upon the compounding recipe in which it is used, the particular dithiocarbamate used, the properties of the vulcanizate desired, and the like. The quantity required to effect a satisfactory cure is appreciably less than is ordinarily required with conventional type accelerators heretofore used, for example, the well-known N-cyclohexyl-2-benzothiazolesulfenamide. Generally the amount of vulcanization accelerator is in the range between 0.05 and 5 parts by weight per 100 parts of rubber with an amount in the range between 0.1 and 2 parts being most generally preferred.

The rosin-extended synthetic rubbers are synthetic rubbery materials in which rosin acid is incorporated in amounts in the range between 15 and 200 parts by weight, preferably between 20 and 100 parts by weight, per 100 parts rubber.

Rosin acid can be incorporated into the rubber by any suitable means, It can be added on the mill either prior to or together with the other compounding ingredients. A convenient method of operation, and one which is frequently preferred, is to prepare a rosin acid-rubber masterbatch by adding the desired quantity of rosin acid, in the form of a rosin soap, to the synthetic rubber latex prior to coagulation. Rosin soap can be added as such to rubber latex or can be used in the form of a solution, whichever is desired. The mixture is then generally heated at a temperature in the range from 125 to 180° F., preferably from 140 to 170° F., and creamed with brine. Coagulation is effected with dilute acid, e. g., sulfuric acid. In order to insure complete conversion of rosin soap to rosin acids, the crumb can be kept in the serum at a relatively low pH, say around 2-3, for a period of one to four hours and more frequently two to four hours.

Various rosin acids, either in the form of the free acids or soaps, such as alkali metal or ammonium soaps, may be obtained from any source, such as wood rosin, and may be used as such or treated in various ways to effect purification, The disproportionated rosin acids, i. e., rosin acids treated in such a way that selective dehydrogenation and hydrogenation occur, are particularly effective. Specific examples of rosin acids which can be used include abietic acid and dehydro-, dihydro-, and tetrahydroabietic acids.

The synthetic rubbery materials in which rosin acids are incorporated are homopolymers of conjugated dienes and copolymers of conjugated dienes with vinyl and vinylidene compounds which are copolymerizable therewith. While any synthetic rubbery material is applicable, it is generally preferred that the rosin acid be incorporated into relatively high Mooney rubbers, e. g., those having Mooney values (ML-4) between 80 and 160. A butadiene-styrene copolymer is quite satisfactory, as is, also, a homopolymer of 1,3-butadiene.

Variable quantities of zinc oxide are used when compounding rosin-extended rubbers. The amount can vary in the range between 0.5 and 25 parts by weight per 100 parts of the rubber-rosin mixture in the compounding recipe and will be governed in large part by the quantity of rosin acid present. As the amount of rosin in the rubber-rosin mixture is increased, it is considered desirable to use larger amounts of zinc oxide in order to avoid "rosin bloom" which frequently occurs when only small amounts of zinc oxide are employed. This subject is discussed in copending application Serial No. 380,883, filed September 17, 1953.

SPECIFIC EXAMPLE

A masterbatch of a 109 Mooney (ML-4) 41° F. 75/25 butadiene/styrene rubber with disproportionated rosin acid was prepared by adding the rosin acid in the form of the sodium salt to the rubber latex, coagulating the latex by treatment with dilute sufuric acid, and then allowing the crumb to remain in contact with the serum at a pjH of 2–3 for two hours to complete the conversion of the rosin soap to rosin acid. The masterbatch contained 35 parts by weight of rosin per 100 parts rubber.

N,N-dimethyl-S-tertiary-butyl sulfenyl dithiocarbamate was employed as a vulcanization accelerator in the rubber-rosin masterbatch described above. For comparative purposes control runs were made using the commercially available vulcanization accelerator, N-cyclohexyl-2-benzothiazolesulfenamide. The following compounding recipes were employed:

| Recipe | Parts by weight | | | |
|---|---|---|---|---|
| | I | II | III | IV |
| Masterbatch | 100 | 100 | 100 | 100 |
| Carbon black [1] | 50 | 50 | 50 | 50 |
| Zinc oxide | 5 | 5 | 5 | 5 |
| Stearic acid | 2 | 2 | 2 | 2 |
| Circosol 2 XH [2] | 5 | 5 | 5 | 5 |
| Paraflux [3] | 5 | 5 | 5 | 5 |
| Sulfur | 1.75 | 2.5 | 1.75 | 2.5 |
| Dithiobarbamate [4] | 0.75 | 0.75 | | |
| Commercial accelerator [5] | | | 1.25 | 2.0 |

[1] Philblack O; high abrasion furnace black.
[2] A petroleum hydrocarbon softener, containing hydrocarbons of high molecular weight, in the form of a heavy, viscous, transparent, pale green, odorless liquid of low volatility; specific gravity, 0.940; Saybolt Universal viscosity at 100° F., about 2,000 seconds.
[3] Saturated polymerized hydrocarbon.
[4] N,N-dimethyl-S-tertiary-butyl sulfenyl dithiocarbamate.
[5] N-cyclohexyl-2-benzothiazolesulfenamide.

The stocks were compounded and cured 30 minutes at 307° F. and physical properties determined. The following results were obtained:

The foregoing data show that 0.75 PHR of the accelerator according to this invention produces approximately the same degree of cure as 1.25–2.00 PHR of the commercial accelerator and that the compositions according to this invention have higher scorch times, i. e., lower tendencies to scorch, than compositions utilizing the commercial accelerator. Furthermore, other properties, such as tensile strength and heat build-up ($\Delta T$) of the compositions of this invention are generally as good as those of the compositions employing the commercial accelerator.

Variation and modification are possible within the scope of the disclosure and claims to this invention, the essence of which is that there is provided a vulcanizable composition comprising a rubbery polymer, such as a butadiene-styrene copolymer, extended with a rosin acid and containing a small amount of an alkyl sulfenyl dithiocarbamate as a vulcanization accelerator; and a method for preparing said composition.

We claim:

1. A vulcanizable composition comprising 100 parts by weight of a rubbery butadiene-styrene copolymer, from 15 to 200 parts by weight of a rosin acid, and from 0.05 to 5 parts by weight of a compound represented by the formula

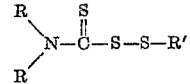

wherein each R is selected from the group consisting of hydrogen, alkyl, cycloalkyl and aryl groups, and radicals which, together with nitrogen, constitute saturated carbon-nitrogen and carbon-nitrogen-oxygen rings having 6 members of which at least 4 members are carbon atoms and not more than one member is nitrogen, not more than one R being hydrogen, and R' is an alkyl radical having not more than 16 carbon atoms, the total number of carbon atoms in the R groups not exceeding 20.

2. A vulcanizable composition comprising 100 parts by weight of a rubbery butadiene-styrene copolymer, having a Mooney value (ML-4) in the range 80–160 at a temperature of 212° F., from 20 to 100 parts by weight of a rosin acid, from 0.5 to 25 parts by weight of zinc oxide, and from 0.1 to 2 parts by weight of N,N-dimethyl-S-tert-butylsulfenyl dithiocarbamate.

3. A process which comprises incorporating into 100 parts by weight of a rubbery butadiene-styrene copolymer from 15 to 200 parts by weight of a rosin acid and from 0.05 to 5 parts by weight of a compound represented by the formula

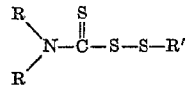

*Comparison of rosin-extended rubber samples according to this invention with samples of same rubber containing commercial accelerator*

UNAGED SAMPLES

| Recipe | Sulfur, PHR | Commercial accelerator, PHR | Dithiocarbamate (this invention), PHR | 80° F. | | | $\Delta T$, °F. | Flex life, M | Shore hardness | Compression set, Percent | Compounded MS 1½ at 212° F. | Minutes to scorch at 280° F. |
|---|---|---|---|---|---|---|---|---|---|---|---|---|
| | | | | 300% modulus, p. s. i. | Tensile, p. s. i. | Elongation, Percent | | | | | | |
| I | 1.75 | | 0.75 | 1,260 | 3,750 | 670 | 48.3 | 28.1 | 49 | 11.6 | 41.5 | 18.5 |
| III | 1.75 | 1.25 | | 850 | 3,440 | 750 | 64.2 | 40.2 | 47 | 18.2 | 45 | 15 |
| II | 2.5 | | 0.75 | 1,830 | 3,630 | 530 | 46.3 | 11.9 | 53 | 10.4 | 41 | 16 |
| IV | 2.5 | 2.00 | | 1,940 | 3,850 | 530 | 43.6 | 10.5 | 54 | 12.0 | 44.5 | 13.5 |

SAMPLES OVEN AGED 24 HOURS AT 212° F.

| I | 1.75 | | 0.75 | 1,950 | 3,790 | 510 | 46.9 | 14.6 | 55 | | | |
| III | 1.75 | 1.25 | | 1,820 | 3,830 | 560 | 50.0 | 15.1 | 57 | | | |
| II | 2.5 | | 0.75 | 2,590 | 3,630 | 415 | 45.3 | 7.6 | 61 | | | |
| IV | 2.5 | 2.00 | | 3,030 | 3,640 | 355 | 44.2 | 4.1 | 67.5 | | | |

(PHR=parts per hundred of rubber.)

wherein each R is selected from the group consisting of hydrogen, alkyl, cycloalkyl and aryl groups, and radicals which, together with nitrogen constitute saturated carbon-nitrogen and carbon-nitrogen-oxygen rings having 6 members of which at least 4 members are carbon atoms and not more than one member is nitrogen, not more than one R being hydrogen, and R' is an alkyl radical having not more than 16 carbon atoms, the total number of carbon atoms in the R groups not exceeding 20.

4. A process which comprises, adding to a latex rubbery butadiene-styrene copolymer a sodium salt of a disproportionated rosin acid, coagulating the latex by treatment with dilute sulfuric acid, allowing the mixture to stand at a pH in the range 2–3 for a time in the range 1 to 4 hours, whereby a coagulated material comprising 100 parts by weight of said copolymer and from 20 to 100 parts by weight of rosin acid is obtained, recovering the coagulated material, adding to said material from 0.5 to 25 parts by weight of zinc oxide and from 0.1 to 2 parts by weight of N,N-dimethyl-S-tert-butylsulfenyl dithiocarbamate, and vulcanizing the mixture thus obtained.

5. In a process in which a synthetic rubber is prepared by incorporating into 100 parts by weight of a rubbery butadiene-styrene copolymer from 20 to 100 parts by weight of a rosin acid and subsequently vulcanizing the resulting mixture, the improvement which comprises adding to said mixture, prior to vulcanization thereof, from 0.1 to 2 parts by weight of N,N-dimethyl-S-tert-butylsulfenyl dithiocarbamate, whereby a vulcanizable mixture having a reduced tendency to scorch is obtained.

6. A composition according to claim 1 wherein said compound is N,N-pentamethylene-S-tertiary-butylsulfenyl dithiocarbamate.

7. A composition according to claim 1 wherein said compound is N,N-(3-oxapentamethylene)-S-tertiary-butylsulfenyl dithiocarbamate.

8. A composition according to claim 1 wherein said compound is N,N-didecyl-S-tert-hexadecylsulfenyl dithiocarbamate.

9. A composition according to claim 1 wherein said compound is N-tert-butyl-N-tert-hexadecyl-S-tert-butylsulfenyl dithiocarbamate.

10. A composition comprising a rosin-acid-extended synthetic rubbery copolymer of a conjugated diene hydrocarbon with a vinylidene compound polymerizable with said diene, and a small amount of an alkyl sulfenyl dithiocarbamate, the alkyl radical having not more than 16 carbon atoms.

11. A composition comprising a rosin-acid-extended polymer of a conjugated diene hydrocarbon having incorporated therein from 0.5 to 25 parts by weight of zinc oxide and from 0.05 to 5 parts by weight of an alkyl sulfenyl dithiocarbamate, the alkyl radical having not more than 16 carbon atoms, per 100 parts by weight of said polymer.

12. A composition according to claim 11 wherein said polymer is a homopolymer of 1,3-butadiene.

13. A process which comprises adding to a latex rubbery butadiene-styrene copolymer a rosin soap, coagulating said latex and liberating rosin acid from said soap, whereby a coagulated material comprising 100 parts by weight of said copolymer and from 20 to 100 parts by weight of rosin acid is obtained, recovering the coagulated material, adding to said material, from 0.1 to 2 parts by weight of N,N-dimethyl-S-tert-butylsulfenyl dithiocarbamate, and vulcanizing the resulting mixture.

14. A composition comprising 100 parts by weight of a synthetic rubbery polymer of a conjugated diene hydrocarbon, from 15 to 200 parts by weight of a rosin acid, and from 0.05 to 5 parts by weight of a compound represented by the formula

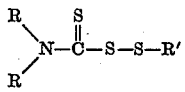

wherein each R is selected from the group consisting of hydrogen, alkyl, cycloalkyl, and aryl groups, and radicals which, together with nitrogen, constitute saturated carbon-nitrogen and carbon-nitrogen-oxygen rings having 6 members of which at least 4 members are carbon atoms and not more than one member is nitrogen, not more than one R being hydrogen, and R' is an alkyl radical having not more than 16 carbon atoms, the total number of carbon atoms in the R groups not exceeding 20.

15. A composition of matter comprising 100 parts by weight of a rubbery copolymer of a conjugated diene hydrocarbon and a vinylidene compound copolymerizable with said diene hydrocarbon, said copolymer having a Mooney viscosity (ML-4) in the range 80 to 160 at 212° F., from 20 to 100 parts by weight of a rosin acid, from 0.5 to 25 parts by weight of zinc oxide, and from 0.1 to 2 parts by weight of N,N-dimethyl-S-tert-butylsulfenyl dithiocarbamate.

References Cited in the file of this patent
UNITED STATES PATENTS

| | | |
|---|---|---|
| 2,024,613 | Teppema | Dec. 17, 1935 |
| 2,368,515 | Blake | Jan. 30, 1945 |
| 2,390,713 | Hunt | Dec. 11, 1945 |
| 2,586,769 | Himmel | Feb. 26, 1952 |
| 2,610,162 | Hoffman | Sept. 9, 1952 |
| 2,638,460 | Crouch | May 12, 1953 |

OTHER REFERENCES

Howland et al.: Ind. and Eng. Chem., May 1953, volume 45, No. 5, pages 1053 to 1059.

UNITED STATES PATENT OFFICE
CERTIFICATE OF CORRECTION

Patent No. 2,870,107　　　　　　　　　　　　　　January 20, 1959

William B. Reynolds et al.

It is hereby certified that error appears in the printed specification of the above numbered patent requiring correction and that the said Letters Patent should read as corrected below.

Column 2, lines 9 and 10, for "N-S-tertiary-butyl sulfenyl dithiocarbamate" read -- N-methyl-S-tertiary-butyl sulfenyl dithiocarbamate --; line 39, for "means," read -- means. --; column 3, line 21, for "sufuric" read -- sulfuric --; line 23, for "pjH" read -- pH --; column 3, line 49, in the Recipe, footnote 2, under the table, for "viscostity" read -- viscosity --.

Signed and sealed this 7th day of July 1959.

(SEAL)
Attest:

KARL H. AXLINE
Attesting Officer

ROBERT C. WATSON
Commissioner of Patents